(12) United States Patent
Stelting

(10) Patent No.: US 8,438,304 B2
(45) Date of Patent: May 7, 2013

(54) METHOD AND SYSTEM FOR AUTOMATICALLY GENERATING SOFTWARE AND CONFIGURING APPLICATION INSTALLATION

(75) Inventor: Stephen Stelting, Broomfield, CO (US)

(73) Assignee: Oracle America, Inc., Redwood City, CA (US)

(*) Notice: Subject to any disclaimer, the term of this patent is extended or adjusted under 35 U.S.C. 154(b) by 946 days.

(21) Appl. No.: 12/235,397

(22) Filed: Sep. 22, 2008

(65) Prior Publication Data

US 2010/0077393 A1  Mar. 25, 2010

(51) Int. Cl.
*G06F 15/173* (2006.01)
(52) U.S. Cl.
USPC ................................................ 709/238
(58) Field of Classification Search ........... 717/174–176
See application file for complete search history.

(56) References Cited

U.S. PATENT DOCUMENTS

| | | | |
|---|---|---|---|
| 7,774,495 B2* | 8/2010 | Pabla et al. | 709/238 |
| 7,805,493 B2* | 9/2010 | Nishio | 709/208 |
| 2003/0041130 A1* | 2/2003 | Harrisville-Wolff et al. | 709/221 |
| 2007/0233877 A1* | 10/2007 | Qu et al. | 709/227 |
| 2009/0280776 A1* | 11/2009 | Chen et al. | 455/411 |
| 2011/0162039 A1* | 6/2011 | Trace et al. | 726/1 |

* cited by examiner

*Primary Examiner* — Don Wong
*Assistant Examiner* — Mohammad Kabir
(74) *Attorney, Agent, or Firm* — Polsinelli Shughart PC

(57) ABSTRACT

Methods and apparatuses are disclosed for automatically generating software and configuring software application installation. Some embodiments may include a method of configuring one or more hardware resources within an enterprise, the method comprising the acts of installing at least one software application on the one or more hardware resources, orienting one or more logical areas within the one or more hardware resources, implementing one or more communication protocols between the one or more logical areas, and generating infrastructure for the at least one software application during the act of installing, wherein the infrastructure is based on predetermined choices.

20 Claims, 6 Drawing Sheets

US 8,438,304 B2

METHOD AND SYSTEM FOR AUTOMATICALLY GENERATING SOFTWARE AND CONFIGURING APPLICATION INSTALLATION

BACKGROUND

Computers are ubiquitous in today's society. They come in all different varieties and can be found in places such as automobiles, the grocery store, banks, personal digital assistants, cell phones, as well as in many companies. For each of these implementations, computers may execute different types of computer software, sometimes called "applications", where the application is custom suited to the particular implementation. In a corporate environment, sometimes called an "enterprise" scenario, the company may have hundreds or thousands of computers being used in different ways each with different software needs. These software needs include applications dedicated to the activities that end users operating the computer may need as well as activities dedicated to the infrastructure and/or management responsibilities. For example, a bank may implement a financial application that allows users to manage their finances from their home computer. In this example, the financial application would include software functionality to actually perform the tasks desired by the user (e.g., transferring money) as well as functionality to manage the infrastructure of the application (e.g., ensuring that the connection between the bank and the user is secure).

Creating this infrastructure software and subsequently installing it can be time consuming and error prone. Also, creating this infrastructure software can delay a company's time to market for its products and reduce its overall profitability. In addition, the problems associated with creating this infrastructure software are only exacerbated with each new software application to be implemented. Furthermore, each customer may require different capabilities in their enterprise software. For example, some customers may require different user interfaces (command line vs. Web user interface). These requirements may rule out otherwise suitable software applications and/or require product re-engineering.

Thus, automatic software generation and automatic system configuration are needed to address one or more of these problems.

SUMMARY

Methods and apparatuses are disclosed for automatically generating software and configuring software application installation. Some embodiments may include a method of configuring one or more hardware resources within an enterprise, the method comprising the acts of installing at least one software application on the one or more hardware resources, orienting one or more logical areas within the one or more hardware resources, implementing one or more communication protocols between the one or more logical areas, and generating infrastructure for the at least one software application during the act of installing, wherein the infrastructure is based on predetermined choices.

A method of automatically generating a software application, comprising the acts of determining the logical orientation of one or more elements of a computer system to which the software will be installed, consulting at least one parameter related to a communication protocol that is to be implemented between the one or more elements, determining whether any of the one or more elements will be nested, and in the event that one or more elements will be nested, repeating the act of determining the logical orientation and the act of consulting the at least one parameter.

A computer system implemented within an enterprise, the computer system comprising a processor and one or more storage devices, the storage devices including executable code and one or more parameters, wherein the executable code is capable of provisioning the computer system into a plurality of logical areas as the computer system is initially configured within the enterprise.

BRIEF DESCRIPTION OF THE DRAWINGS

For a detailed description of the various embodiments of the invention, reference will now be made to the accompanying drawings, in which.

The use of the same reference symbols in different drawings indicates similar or identical items.

DETAILED DESCRIPTION

According to some embodiments, a method and system are disclosed for automatically generating software and optionally configuring a computing system as the software is installed in enterprise environments using an automated software generation tool. An enterprise environment may include multiple client and server software applications. As part of the software generation process, an automated software generation tool may utilize parameters provided by the enterprise and/or the software vendor to generate infrastructure code that is then integrated by the software generation tool along with application code. Based on the decisions of software developers, the automated software generation tool may create the required infrastructure to host the application code, and also may generate the application programming interfaces (APIs) required to invoke key services in the support infrastructure.

In some embodiments, the automated software generation tool may be capable of creating installation and configuration software for the application. The software installer may leverage existing operating system (OS) virtualization technologies to create and configure a virtualized hosting environment for the application software.

By creating and configuring a virtualized OS environment to host the enterprise application, many of the errors that usually occur in software installations can be avoided, thereby allowing enterprise customers to optimize resources in their datacenters. For example, creating and configuring a virtualized OS environment as part of software installation may allocate an appropriate amount of disk space in the virtualized OS instance, may set up appropriate local accounts and permissions, and may ensure correct allocation of global CPU and memory resources.

Figure 1:
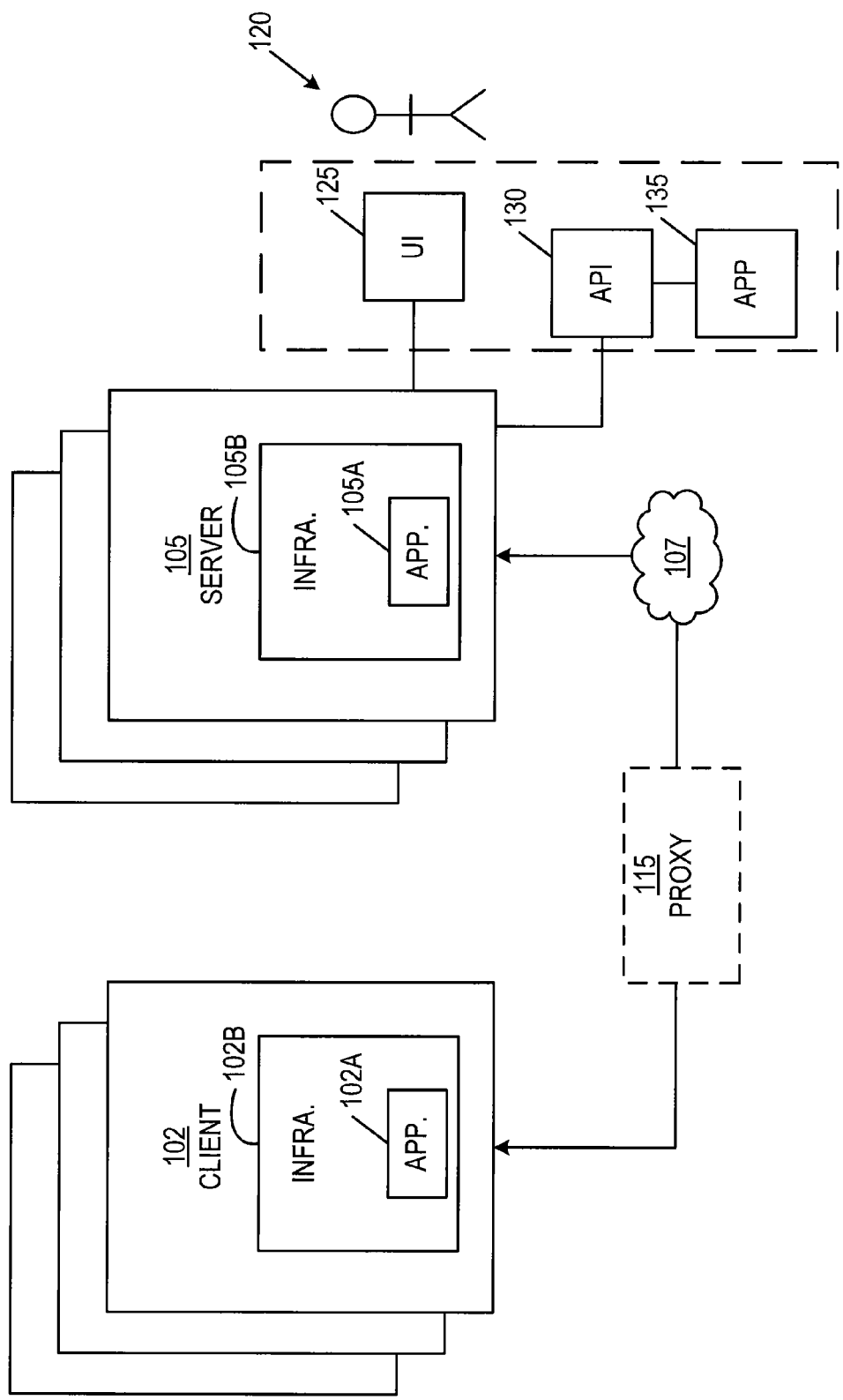
FIG. 1 illustrates a client-server arrangement.

FIG. 1 depicts a client-server arrangement 100 according to one embodiment. While the terms "client" and "server" may refer, in some embodiments, to actual physical computers having client and server functionality, other embodiments refer to software programs or applications that have client and server functionality. The client-server arrangement 100 depicts the relationship between one or more client programs or applications 102 and a server program or application 105. In some embodiments, the client applications 102 may execute on a separate physical computer from the server applications 105, while in other embodiments, the client applications 102 and the server applications 105 execute on the same physical computer and/or virtual OS environment.

As shown in FIG. 1, the client applications 102 communicate with the server applications 105 via a network 107. Depending upon the specific configuration of the client server arrangement 100, the network 107 may be the Internet in some embodiments, or a local intranet in other embodiments.

During operation, the client applications 102 may make requests from the server applications 105 and await a response from the server applications 105. The particular response by the server applications 105 depends upon the nature of the client and server applications. In some embodiments, a user 120 may operate a user interface 125 to initiate interactions between the client applications 102 and the server applications 105 via the user interface 125. For example, the client applications 102 and the server applications 105 may perform banking functions that allow the user 120 to make requests through the user interface 125 for balance information. This user interface 125 may be a graphical user interface (GUI) or a command line interface (CLI). In other embodiments, interaction with the client applications 102 may occur through an API 130, where another application 135 invokes functions of the client applications 102 through the API 130. For example, the application 135 may request from the client applications 102, through the API 130, a group of balance information for hundreds of customers of the financial institution.

Communications between the client 102 and the server application 105 may be routed through one or more proxy servers 115. Implementing proxies in this manner may allow protocol changes from server to client, may allow the support of more efficient network bandwidth consumption, may allow a reduction in the overall load on the server, and/or may allow support for an intermediate cache of application data for asynchronous application processing or more efficient communication.

During operation, the client application 102 may connect to the one or more proxy servers 115 and request service, such as a file, connection, Web page, or other resource, available from the server application 105. The one or more proxy servers 115 may provide the requested resource by connecting to the server application 105 and requesting service on behalf of the client application 102. In some embodiments, the proxy server 115 optionally may alter the request from the client application 102 or the response from the server application 105. In other embodiments, the one or more proxy servers 115 may fulfill the request without contacting the server application 105. Continuing with the financial institution example from above, the user 120 may request, through the client application 102, the most current interest rates from the financial institution. If the one or more proxy servers 115 recently provided this same request to another user previously, it may fulfill this request without burdening the server application 105, and therefore, the number of requests that the server application 105 must fulfill may be reduced.

As shown in FIG. 1, the client applications 102 include non-infrastructure portions or applications 102A supported by infrastructure portions 102B. Likewise, the server applications 105 include non-infrastructure portions 105A and infrastructure portions or applications 105B. The infrastructure portions 102B and 105B may be code that runs, supports, hosts, and/or provides services for the application code 102A and 105A.

Software developers typically build the infrastructure portions 102B and 105B as well as the application code 102A and 105A for each of the applications in the client-server arrangement 100. Notably, the client-server arrangement 100 may implement multiple different client applications 102 and/or multiple different server applications 105. While the applications 102A and 105A may include code that is specific to the particular client-server application, the infrastructure portions 102B and 105B, on the other hand, may include code that is somewhat generic to the application.

In general, infrastructure portions 102B and 105B may be made part of the hosting environment for the application. As such, the infrastructure 102B and 105B may provide services for the application on an as-needed basis. For example, the application code may invoke infrastructure functions through one or more APIs such as communication protocols, logging, security, a runtime framework (to start, stop, and/or manage the application software in a controlled way), persistence management (data storage and/or retrieval), support for a command line interface (CLI), and support for an API to name but a few.

For example, one of the client applications 102 may allow the user 120 to request financial information from the server application 105 with regard to the user's current bank account balances while another of the client applications 102 may allow the user 120 to determine the user's current stock holdings. These two applications may have non-infrastructure portions 102A and 105A that are different while the infrastructure portions 102B and 105B may share some common functionality. Examples of common infrastructure functionality between the client and server applications include code that ensures secure communication between the client application and the server application. Examples of differing non-infrastructure functionality 102A and 105A may include code that performs the actual business application, code that provides the graphical user interface, etc.

Figure 2:
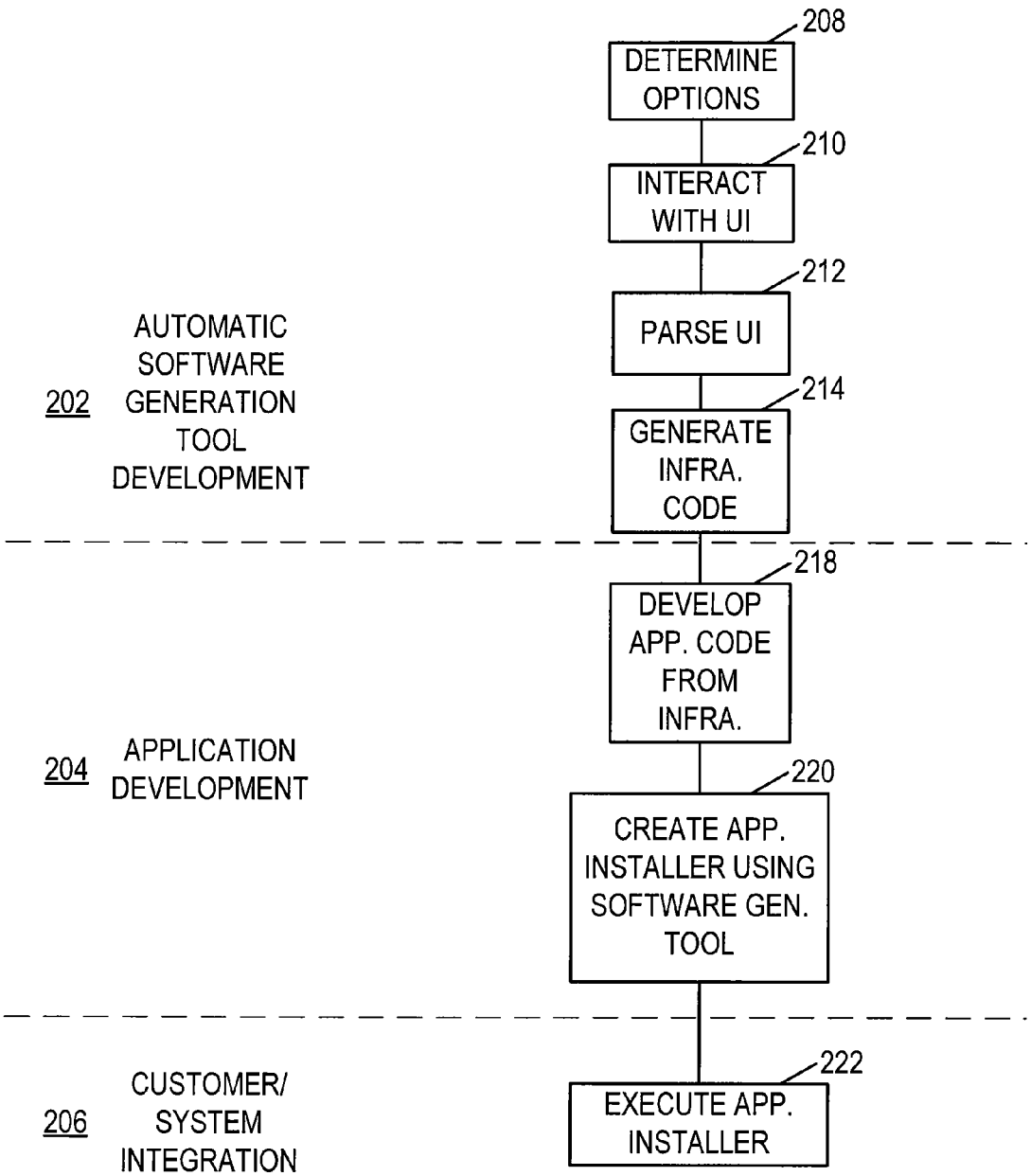
FIG. 2 represents an exemplary flowchart for automatic software generation and installation.

FIG. 2 illustrates an exemplary overview of automatic software generation according to at least one embodiment. As shown in FIG. 2, there may be at least three phases of automatic software generation and development, each associated with a different party within the enterprise software development chain, including, software generation tool development 202, application development 204, and the end customer or systems integration 206.

Referring to the software generation tool development 202, initially, the parameters and/or options for the automatic software generation tool are determined in block 208. In some embodiments, the automatic software tool developed in phase 204 may be developed by companies such as Sun Microsystems, Inc or IBM, Inc. These automatic software tool developers may consult with one or more of their customers to determine the types of applications that the customer may need in block 208. In some embodiments, the customer may be a financial institution, such as a bank, that desires to implement online banking software for its customers.

Next, in blocks 210-214, the automatic software generation tool is developed. In block 210, a software developer may interact with a user interface to select certain code to incorporate APIs and/or infrastructure code into the tool. As mentioned above, this infrastructure code may include communication protocols, logging, security, a runtime framework (to start, stop, and/or manage the application software in a controlled way), persistence management (data storage and/or retrieval), and support for a command line interface (CLI) to name but a few. In block 212, the information from the user interface in block 210 is parsed to establish what code will be created for the application development phase 204. In some embodiments, this may include parsing the information from the user interface in block 210 according to a set of predetermined rules.

The infrastructure code may be generated based on the predetermined framework of rules per block 214. In some embodiments, the rules in block 214 may include requests for software that may process, define, and/or create rules within the software application being developed during the software development phase 202. For example, a software development team may select an optional proxy in their UI. An embedded rules engine may generate code to represent the option, and later, the same rules may be used to create screens for a smart installer of the developed software application. Thus, in some embodiments, using a set of predetermined rules to develop software may provide an effective way to generate the installation choices and rules, and subsequently use those rules to build a smart installer (e.g., shown in FIG. 3B).

In some embodiments, the infrastructure code generated in block 214 may be java code that is implemented on a java virtual machine (JVM) capable of being segmented into multiple logical areas, referred to as "application containers". Commercial examples of exemplary application containers include the type employed in the Java Platform, Enterprise Edition (JavaEE) or the .NET framework.

Once the automated software generation tool development 202 is complete, the software generation tool may be used to create a framework for the enterprise application (such as applications 102A and 105A) and the application code to run in the framework may be developed. The application framework is generated in block 218, and is shown in more detail in FIG. 3A.

Figure 3A:
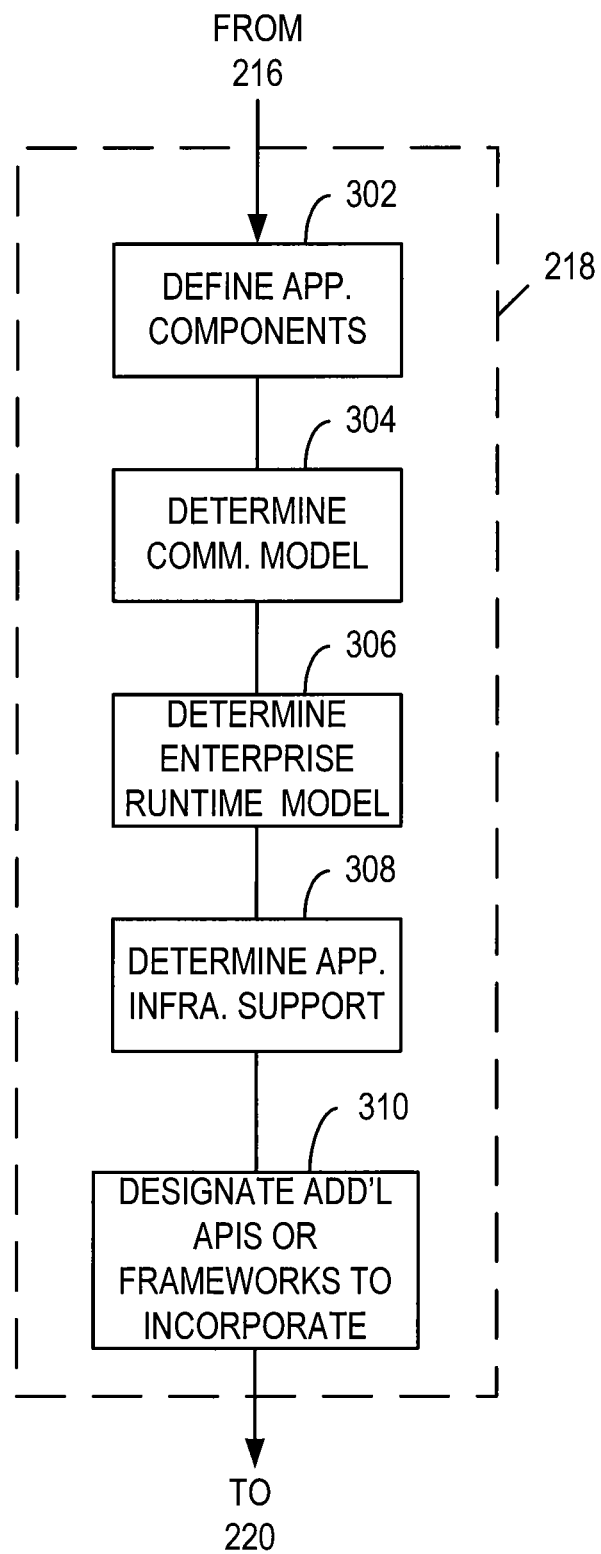
FIG. 3A is a flowchart illustrating automatic software generation.

Referring to FIG. 3A, exemplary generation of the application framework (per block 218) is illustrated. In some embodiments, this application framework may be based upon the infrastructure code generated in block 214. In block 302, the application components and rules are defined. At this stage, the application development team may establish the client-server configuration shown in FIG. 1, for example, by making selections on a UI. Also, at this stage, the application development team may specify proxy configurations. This may include rules as to whether the proxies are nested and whether the proxies are optional. Further, in block 302, the application developers may allow optionally installed API and CLI components and also specify whether a rich Web UI will be supported by the application.

Once the application's components and rules are defined, the communication model may be determined in block 304. At this stage, the communication model may be determined for a variety of communication channels. Exemplary communication models include server-proxy, proxy-proxy, proxy agent, and/or server agent if no proxy is used. In some embodiments, a communication channel may be a server-proxy channel, and this channel may comprise an HTTPS secured communication channel and/or a TCP/IP communication channel. In some embodiments, the communication channel may comprise an Internet inter-object-request-broker protocol (IIOP) where object request brokers (ORBs) may communicate. In object-oriented languages, the ORB may take the form of an object with methods enabling connection to the objects being served. After an object connects to the ORB, the methods of that object may then be accessible for remote invocations over the defined channel. Also, in block 304, the server may be configured to allow optional notification using SNMP or e-mail. In any case, it should be noted that these protocols are merely exemplary and other such protocols may be used.

Next, the enterprise runtime model may be defined in block 306. This may include providing methods that support transactional behavior rather than just a single use. For example, in some embodiments, the business methods may include banking transactions that involve transferring money between first and second financial institutions. A transfer of money between the financial institutions may involve a withdrawal from the first institution and a deposit in the second institution. If the withdrawal from the first institution fails for some reason (e.g., insufficient funds), the deposit should not proceed. In other words, if the entire transfer (withdrawal plus deposit) is successful, then the transfer will go forward or committed and will be reversed or rolled back otherwise.

In other embodiments, the runtime model, (defined in block 306), may include support for a transactional model, parallel execution, and lifecycle methods (such as initializers and/or destructors). For example, in an online banking application, the online banking application may use a global (application-level) initalizer method to parse configuration files and start up global services for a new instance of the application. Such an exemplary method may configure the logging system of the exemplary banking application, set up email notification for product support, and may establish communication with a global lookup service. Such a method also may be used to set up global resource pools like connection pools for a database. An exemplary global destructor may be used to handle application clean up activities. Such an exemplary method may be used to close global resource pools, close log files, and/or send email notifications to indicate that the application terminated operations normally.

In block 308, the application developers may determine the support structure for the application's infrastructure. This may include establishing the logging and error models. The logging model may include support features such as allowing the proxy to independently log its status or allowing the proxy to consolidate logging into a server log file as well as designating the output format of the log file. Allowing the proxy to independently log its status may add complexity to the proxy configuration, whereas allowing the proxy to consolidate logging into a server log file may add network traffic. Thus, the application developer may chose between proxy complexity and network traffic with the automated software development tool.

Also, in block 308, the application developer may establish the error reporting model for the application. This may include implementing the error handling in the application code (e.g., with logging). The error handling configuration also may include enabling the various system components (proxy, agent, server) to escalate errors between them.

Next, in block 310, the application developer may designate additional APIs and/or frameworks to incorporate into the application. For example, this may include determining whether the application will support a rich Web UI, such as ZK Framework, which may enable a rich UI for Web applications with less direct coding on the part of the application developers.

Referring momentarily back to FIG. 2, once the application framework and code have been generated per block 218 the software generation tool may create an application installer per block 220. This may allow the application being developed to be installed with one or more preconfigured options that may be configured at the time of application development by the application developers. The creation of the application installer, per block 220, is shown in more detail in FIG. 3B. In some embodiments, the application installer shown in FIG. 3B may be used just before the application is released to the enterprise.

Figure 3B:
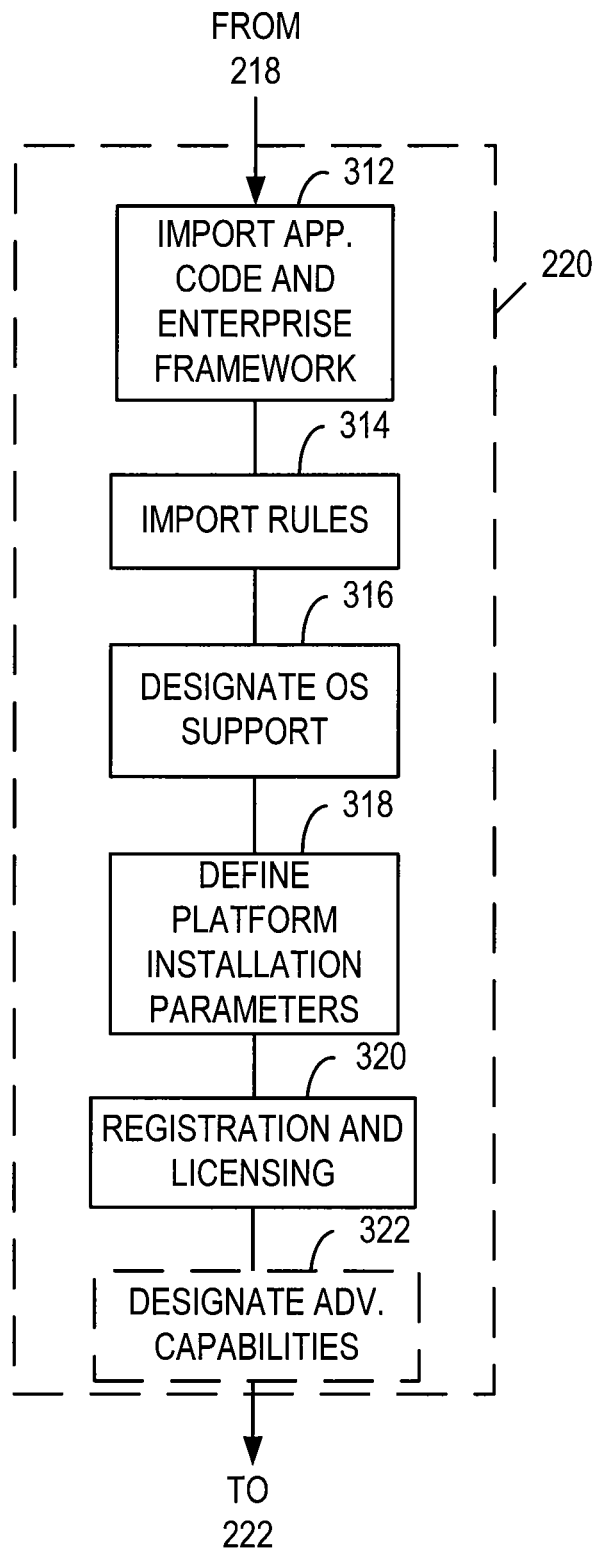
FIG. 3B is a flowchart illustrating the creation of an application installer.

Referring to FIG. 3B, the application code and enterprise infrastructure framework (from block 218) may be imported into the application installer in block 312. Next, in block 314, the application parameters or rules may be imported into the application installer. This may include identifying rules for software components such as server, proxy, client, Web UI (in the embodiments that include a Web server), as well as installation rules for APIs and/or CLIs. The imported rules also may include establishing OS support capabilities for the application being installed, which may be based on either explicit or implied constraints. Furthermore, as part of importing the framework per block 312, the configuration options of the application may be determined, such as, allowing optional SNMP and/or email notification or allowing proxies to be nested.

Next, in block 316, the OS support for the application may be designated in the application installer. This may include identifying OSs and/or versions of OSs that are supported by the application being installed. In some embodiments, checking the OSs in this manner may be selectively enabled and disabled, which may be useful for applications intended for java platforms. In other embodiments, block 316 may include virtualizing certain hardware and/or software resources. The term "virtualization" refers to abstracting hardware and/or software resources within an enterprise to allow efficient allocation of computing resources.

Once the OS support is designated in block 316, the platform installation parameters may be determined in block 318. This may include determining parameters that relate to installation rules for each component of the application to be installed. For example, if the application is installed on a Solaris 10 SPARC® platform, then the application may have a certain storage space requirement (e.g., 2 GB) and scripting support requirements (e.g., PERL 5.8) that are different from other platforms. Furthermore, the platform installation parameters may be different for the server, proxy and client components.

In block 320, the applications registration and licensing install parameters may be configured. This may include configuring the application installer to prompt the systems integrator for a license key to run the application. This also may include designating a URL during installation from which the systems integrator can access a Web page to register the application and obtain a license key.

Once the registration and licensing installation parameters are provided in block 320, advanced installation capabilities optionally may be provided for in block 322. For example, the installer may auto-configure logical areas or containers for the server and/or proxy during installation. Furthermore, in some embodiments, systems integrators may be allowed to remotely install proxies during server install. In other embodiments, systems integrators may be able to import lightweight-directory-access-protocol (LDAP) users and groups during installation and setup.

Figure 4:
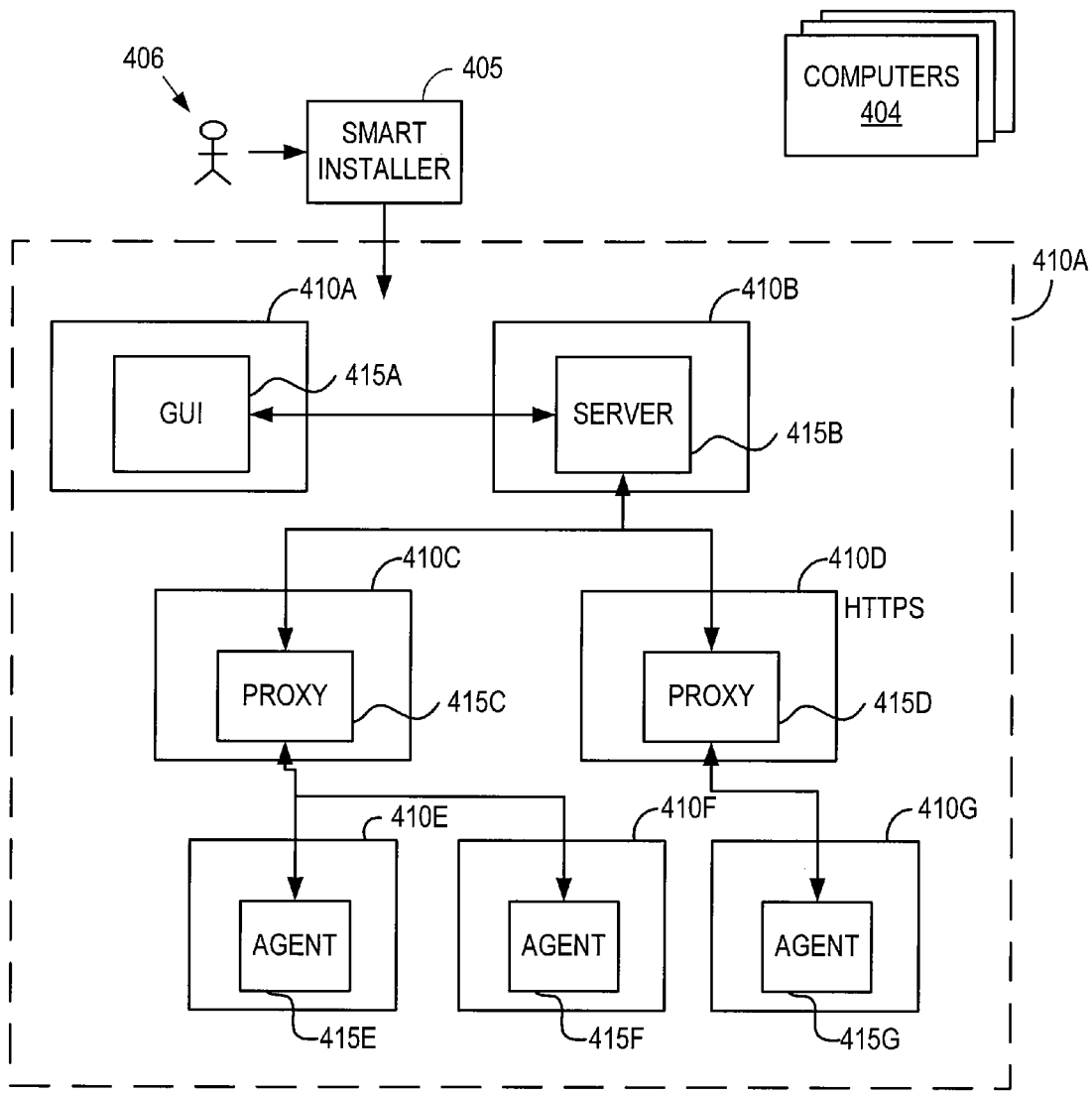
FIG. 4 is an exemplary virtualized enterprise system.

Once the application installer has been configured, the systems integrator may execute the application installer and decide what installation options to utilize as shown in FIG. 2 at block 222 and depicted in further detail in FIG. 4.

FIG. 4 depicts an exemplary enterprise 400 that may host one or more software applications. The computing environment 400 may optionally be virtualized to support key business or technical requirements. A systems integrator 406 (which my include a field engineer), may use an installer 405 to install the software application onto systems within the enterprise. The installer 405 may include the software application resulting from the operations shown in FIGS. 3A-3B. The computer 402 may include one or more logically different areas 410A-G. Each of the one or more logically different areas 410A-G may implement one or more applications (e.g., GUI, server, proxies, agents) within frameworks 415A-G. The frameworks 415A-G may correspond to the infrastructure code framework 102A and 105A and may reflect certain of the baseline parameters set forth in block 220 and/or installation parameters set forth in block 222, where these parameters may be provided by the enterprise 400. For example, the proxy server in logical area 410D may need to provide secure communications between the agent application in logical area 410G and the server application in logical area 410B, and therefore, the transfer protocol may be configured as an "HTTPS" connection where certificates are exchanged between the server and the agent applications. Also, the communication protocol between the proxy in logical area 410D and the agent application in logical area 410G may be customized.

The virtual installation options shown in FIG. 4 are configured independent of the virtual options specified for other logical areas within the computer 402. More importantly, computers other than the computer 402 that are also within the enterprise 400, such as computers 404, may be custom configured as they are physically installed within the enterprise 400 and configured with software applications.

In some embodiments, the computer manufacturer may deliver the computers to the enterprise 400 where the computers have already been virtualized by the computer manufacturer at the request of the enterprise 400. If the enterprise 400 has hundreds, or even thousands, of computers, then delivering the computers in a virtualized state is advantageous because it may reduce and/or eliminate errors that occur if a systems administrator manually virtualized each of the hundreds or thousands of computers within the enterprise 400. By reducing and/or eliminating the errors that may occur when virtualizing the computers, the enterprise 400 now may purchase the optimum amount of computing resources rather than additional and physically separate computers that execute the applications.

Figure 5:
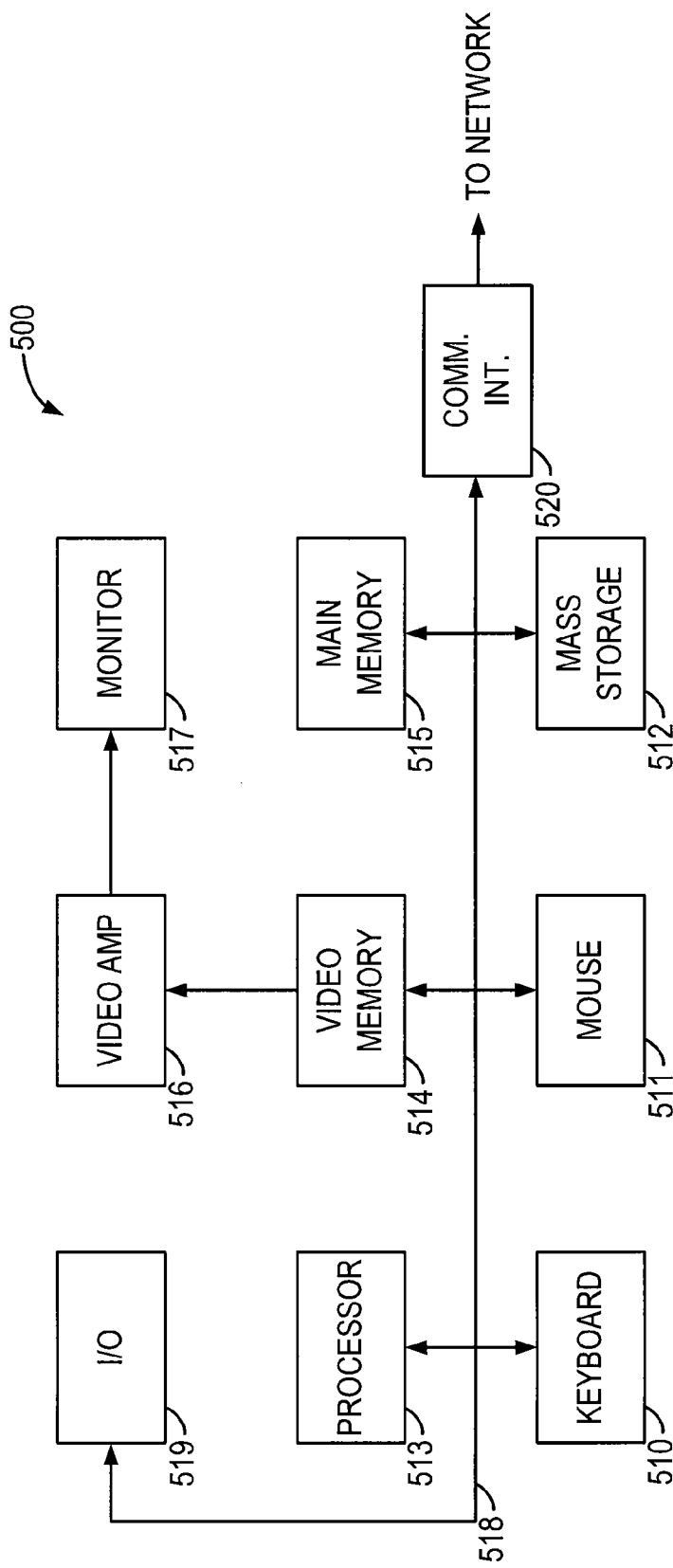
FIG. 5 is an exemplary computer system that may be virtualized.

An exemplary computer system 500, akin to the type implemented in the enterprise 400, is shown in FIG. 5. The computer system 500 may be virtualized in many different ways. For example, the computer system 500 may execute both the client applications 102 and the server applications 105, where the client applications 102 and the server applications 105 are virtualized as described above. In this virtualized operational state, one or more of the components within the computer system 500 may be assigned to the client applications 102 as well as to the server applications 105.

Referring to computer system 500 shown in FIG. 5, a keyboard 510 and mouse 511 are coupled to a system bus 518. Keyboard 510 and mouse 511, in one example, introduce user input to computer system 500 and communicate that user input to a processor 513. Other suitable input devices may be used in addition to, or in place of, mouse 511 and keyboard 510. An input/output unit 519 (I/O) coupled to system bus 518 represents such I/O elements as a printer, audio/video (A/V) I/O, etc.

Computer 500 may also include a video memory 514, a main memory 515 and a mass storage 512, all coupled to system bus 518 along with keyboard 510, mouse 511 and processor 513. Mass storage 512 may include both fixed and removable media, such as magnetic, optical or magnetic optical storage systems or any other available mass storage technology. Bus 518 may contain, for example, address lines for addressing video memory 514 or main memory 515. System bus 518 also includes, for example, a data bus for transferring data between and among the components, such as processor 513, main memory 515, video memory 514 and mass storage 512.

In some embodiments, processor 513 is a SPARC® microprocessor from Sun Microsystems, Inc., or a microprocessor manufactured by Motorola, such as the 680XX0 processor, or a microprocessor manufactured by Intel, such as the 80X86, or Pentium processor. Any other suitable microprocessor or microcomputer may be utilized, however. Main memory 515 may include dynamic random access memory (DRAM), static random access memory (SRAM), magnetic random access memory (MRAM) or the like. Video memory 514 may be a dual-ported video random access memory. One port of video memory 514, in one example, is coupled to video amplifier 516, which is used to drive a monitor 517. Monitor 517 may be any type of monitor suitable for displaying graphic images, such as a cathode ray tube monitor (CRT), flat panel, or liquid crystal display (LCD) monitor or any other suitable data presentation device.

Computer 500 also may include a communication interface 520 coupled to bus 518. Communication interface 520 provides a two-way data communication coupling via a network link, such as network 107. For example, communication interface 520 may be an integrated services digital network (ISDN) card or a modem, a local area network (LAN) card, or a cable modem or wireless interface. In any such implementation, communication interface 520 sends and receives electrical, electromagnetic or optical signals which carry digital data streams representing various types of information.

The client applications 102 and the server applications 105 may be executed by processor 513, or in some embodiments, they may be stored in mass storage 512 or other non-volatile storage for later execution. In this manner, computer 500 may obtain application code in a variety of forms. Application code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

The above discussion is meant to be illustrative of the principles and various embodiments of the present invention. Numerous variations and modifications will become apparent once the above disclosure is fully appreciated. In addition, the above description has broad application, and the discussion of any embodiment is meant only to be exemplary, and is not intended to intimate that the scope of the disclosure, including the claims, is limited to these embodiments.

I claim:

1. A method of configuring resources comprising:
generating one or more application frameworks for at least one software application;
installing the at least one software application on the one or more hardware resources of an enterprise system;
orienting one or more logical areas within the one or more hardware resources, the one or more application frameworks implemented within the one or more logical areas;
implementing one or more communication protocols between the one or more logical areas; and
generating infrastructure for the at least one software application during the act of installing, wherein the infrastructure is based on predetermined choices.

2. The method of claim 1, wherein the one or more hardware resources includes a single computer.

3. The method of claim 1, wherein the act of orienting one or more logical areas within the one or more hardware resources occurs during the act of installing the at least one software application.

4. The method of claim 1, further comprising the act of consulting one or more parameters to determine if a nested proxy is present.

5. The method of claim 1, wherein the at least one software application includes an infrastructure framework.

6. The method of claim 5, wherein the act of orienting one or more logical areas within the one or more hardware resources further includes the act of checking the infrastructure framework.

7. A method of automatically generating a software comprising:
generating one or more application frameworks for at least one software application;
determining the logical orientation of one or more elements within an enterprise system to which the at least one software application will be installed, the logical orientation comprising one or more logical areas implementing the one or more application frameworks;
consulting at least one parameter related to a communication protocol that is to be implemented between the one or more elements based on the logical orientation of each of the one or more elements;
determining whether any of the one or more elements will be nested based on the at least one parameter; and
in the event that one or more elements will be nested, repeating the act of determining the logical orientation and the act of consulting the at least one parameter.

8. The method of claim 7, further comprising the act of determining an appropriate interface for the at least one software application.

9. The method of claim 8, wherein the at least one software application is a client application.

10. The method of claim 7, further comprising the act of integrating infrastructure and non-infrastructure portions of programming code.

11. The method of claim 7, further comprising virtualizing one or more elements of the computer system.

12. The method of claim 7, wherein the computer system is a single computer system.

13. A computer system comprising:
a processor; and
one or more storage devices, the storage devices including executable code and one or more parameters to:
generate one or more application frameworks for at least one software application;
install the at least one software application on the one or more hardware resources of an enterprise system;
orient one or more logical areas within the one or more hardware resources, the one or more application frameworks implemented within the one or more logical areas;
implement one or more communication protocols between the one or more logical areas; and
generate infrastructure for the at least one software application during the act of installing, wherein the infrastructure is based on predetermined choices.

14. The computer system of claim 13, wherein at least two of the one or more of the logical areas share a portion of an operating system loaded on the computer system.

15. The computer system of claim 14, wherein the one or more parameters reflect security policies between at least two of the logical areas.

16. The computer system of claim 15, wherein the security policies include exchanging certificates between the at least two logical areas.

17. The computer system of claim 13, wherein at least two of the logical areas are nested.

18. The computer system of claim 13, wherein the computer system is a single computer.

19. The computer system of claim 13, wherein the executable code include infrastructure code and non-infrastructure code.

20. The method of claim 1, wherein the at least one software application is an enterprise application wherein the application framework comprises proxy configurations and an application programming interface.

* * * * *